April 22, 1924.
W. F. PFANDER ET AL
1,491,621
ROADSTER TOP REST
Filed April 21, 1923
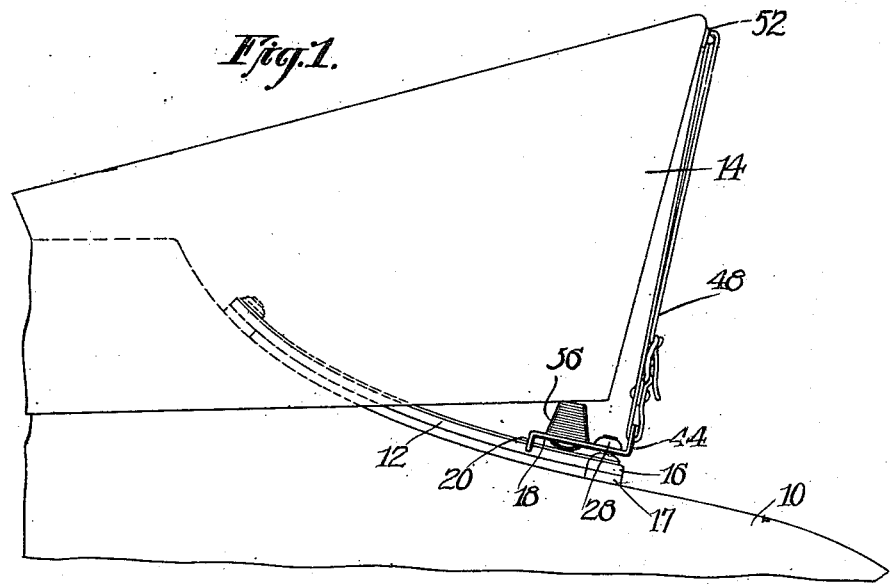
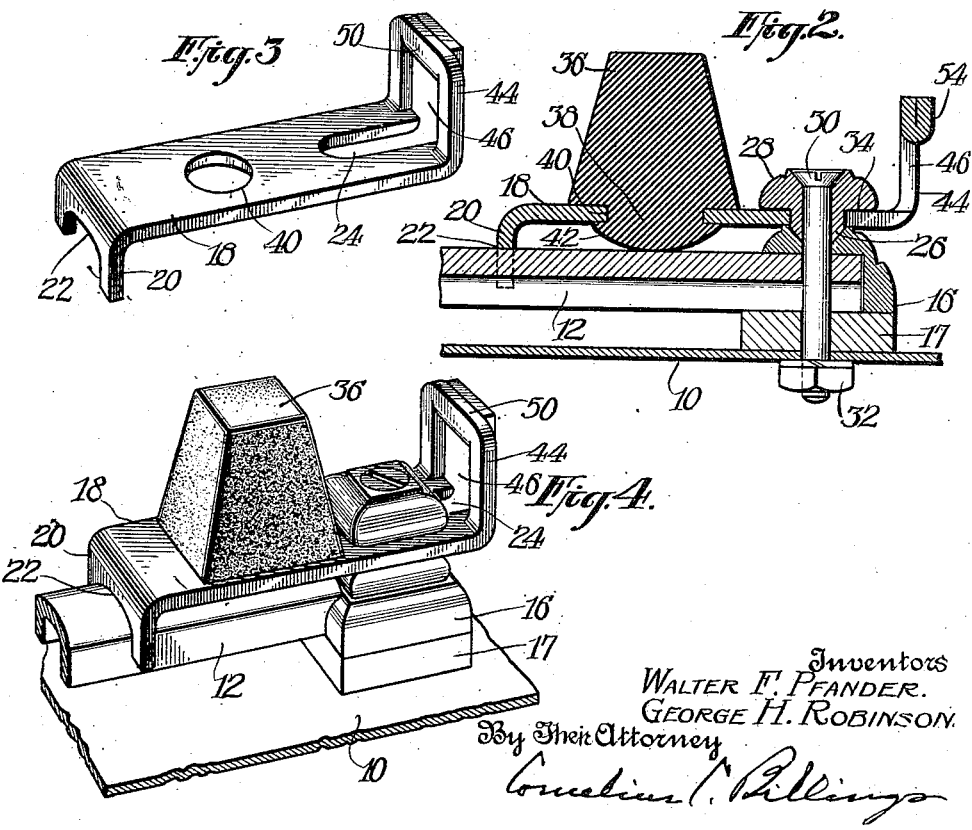
Inventors
WALTER F. PFANDER.
GEORGE H. ROBINSON.
By their Attorney
Cornelius C. Billings Patented Apr. 22, 1924.

1,491,621

UNITED STATES PATENT OFFICE.

WALTER F. PFANDER, OF YONKERS, AND GEORGE H. ROBINSON, OF NEW YORK, N. Y., ASSIGNORS TO WILLIAM C. DURANT.

ROADSTER TOP REST.

Application filed April 21, 1923. Serial No. 633,579.

*To all whom it may concern:*

Be it known that we, WALTER F. PFANDER and GEORGE H. ROBINSON, citizens of the United States, and residents, respectively, of Yonkers, county of Westchester, State of New York, and borough of Manhattan, city, county, and State of New York, have jointly invented certain new and useful Improvements in Roadster Top Rests, of which the following is a specification.

This invention relates to vehicle top rests and more particularly to a top rest and holder especially adapted for use on automobiles of the roadster or runabout type.

An object of our present invention is to provide a top rest and holder for supporting and securing the top in its lowered, folded position on the deck of the vehicle immediately back of the seat.

Another object of the invention is to provide a top rest and holder for supporting and securing the lowered top near or at the top or cross portion of the bows of the top.

A further object of the invention is to provide a top rest and holder which may be readily removed when not in use and readily replaced for use.

With these and other objects in view our invention comprises the device described and set forth in the following specification and claims.

The various features of the invention are illustrated in the accompanying drawing in which, Fig. 1 is a side view of a portion of an automobile having a top rest embodying a form of our invention mounted on the deck to the rear of the driver's seat.

Fig. 2 is a longitudinal section of the top rest and a portion of the automobile deck illustrating the construction and mounting of the rest.

Fig. 3 is a perspective view of a bracket forming a portion of the top rest, and, Fig. 4 is a perspective view of the top rest and a portion of the deck on which it is mounted.

In our present invention, the top rest is positioned on the deck panel of the vehicle approximately under the upper part of the bow of the top as it is folded back over the seat of the vehicle. The top rests are preferably adapted to be mounted on the panel guards of the vehicle by means of a suitable supporting bracket which may be inserted beneath a knob so mounted on the guards that may be loosened to readily receive the bracket and tightened to hold it in place. A suitable resilient bumper of rubber or other suitable material is mounted on this bracket in position to support the rear bow of the top and a strap is also secured to the bracket in such a manner that it may be attached to the front bow of the top to hold the top compactly and firmly in position on the rest.

Referring more particularly to the accompanying drawings, a top rest embodying our invention is illustrated as mounted on a deck 10 of a vehicle of the usual runabout type, having deck guards 12 extending lengthwise of the deck, in position to support a top 14. In the example shown the rest is mounted at the rear of the two outer guards and is supported partly on the upper surface of the guard 12 and partly on a block 16 which is supported by a block 17, both supporting the rear end of the guard.

The rest comprises a supporting bracket 18 having a downturned forward flange 20, the lower edge 22 of which is shaped to fit the contour of the upper surface of the guard 12. The rear end of the bracket 18 is supported on the upper surface of the block 16 and is provided with a slit 24 extending forwardly from its rear edge to receive a downwardly projecting stem or neck 26 of a knob 28 mounted on the block 16. The knob 28, blocks 16 and 17, guard 12 and deck 10 are provided with aligned holes or openings through which a bolt 30 may extend. The bolt 30 is provided with a nut 32 at its lower end so that by turning the bolt to loosen the nut, the bracket 18 may be inserted between the top surface of the block 16 and a shoulder 34 on the knob 28, and by tightening the bolt the bracket may be clamped between the shoulder 34 and the block 16.

A rubber bumper or cushion 36 is mounted on the bracket 18, preferably between the slit 24 and the downturned flange 20, in position to support the rear, lowermost bow of the top when folded. The bumper is secured on the bracket by means of a neck 38 extending downwardly through a hole 40 in the bracket and a head 42 extending over the lower edge of the hole 40.

The rear end of the bracket 18 is provided with an upturned flange 44 having an opening 46 merging with the slit 24 and of sufficient size to permit the passage of the knob 28. A strap 48 is inserted through the opening 46 and secured at one end about the upper edge or span 50 of the flange. The free end of the strap is secured through a loop or hook 52 on the front or upper bow of the top and drawn downwardly and secured to hold the top securely in position on the bumper 36. The upper edge or span 50 of the opening 46 is doubled as at 54 to provide a broad, rounded support for the strap 48.

When the top is in its upright, raised position the top rest is removed and carried under the seat or other suitable place, the deck and guards appearing the same as is customary except for the knobs 28 on the rear ends of the two outer guards. When the top is to be lowered, the knobs 28 are loosened by turning the bolts 30 and the bracket 18 is inserted between the shoulder 34 of the knob and the top of the block 16, the knob passing through the opening 46. The knob 28 is then tightened by turning the bolt 30 and the top is lowered onto the bumper 36. The strap 48 is then inserted through the loop 52 on the front bow of the top and the top is securely drawn into a compact position on the bumper 36.

This invention therefore provides a top rest which is inconspicuous when not in use and which firmly and rigidly secures the top or rear portion of the top when folded.

As changes of construction could be made within the scope of our invention, it is intended that all matter contained in the above description or shown in the accompanying drawings shall be interpreted as illustrative and not in a limiting sense.

Having thus described our invention what we claim as new and desire to secure by Letters Patent is:

1. A device of the type described which comprises, a bracket having a downwardly extending portion formed to fit the guard of a vehicle deck, a rubber bumper on the upper surface of said bracket, means for attaching a strap to said bracket, and means extending downwardly for removably attaching said bracket to, and supporting it on, said guard of said vehicle deck.

2. A device of the type described which comprises a bracket having a downwardly extending portion formed to fit the guard of a vehicle deck, an upwardly extending flange having an opening therethrough, and a slot extending from said opening into the portion of said bracket between said flanges, and a rubber bumper on the upper surface of said bracket.

3. A device of the type described which comprises a bracket formed of a metal strip bent downwardly at one end and bent upwardly at the opposite end, said downwardly bent portion being adapted to fit a deck guard of a vehicle, and the upwardly bent portion being slotted to receive a strap and the intermediate portion having a slit extending from said upright portion, and a resilient bumper mounted on said intermediate portion of said bracket.

4. A device of the type described which comprises a knob permanently mounted on deck guard of a vehicle and adapted to be tightened and loosened thereon, a bracket adapted to rest on said guard and to be inserted between said knob and guard when said knob is loosened and secured in position when said knob is then tightened and a rubber bumper mounted on said bracket.

5. A device of the type described which comprises a knob permanently mounted on a deck guard of a vehicle and adapted to be tightened and loosened thereon, a bracket adapted to rest on said guard and to be inserted between said knob and said guard when said knob is loosened and secured in position when said knob is then tightened, a rubber bumper on said bracket and a strap attached to said bracket.

6. A device of the type described which comprises a knob permanently mounted on a deck guard of a vehicle and adapted to be tightened and loosened thereon, a bracket adapted to rest on said guard and to be inserted between said knob and said guard when said knob is loosened and to be secured in position when said knob is then tightened, a rubber bumper on said bracket and headed through an opening therein and a strap attached to said bracket.

WALTER F. PFANDER.
GEORGE H. ROBINSON.